Dec. 24, 1946.  R. C. LUEDTKE  2,413,059
PISTON AND CONNECTING ROD THEREOF
Filed Aug. 3, 1944
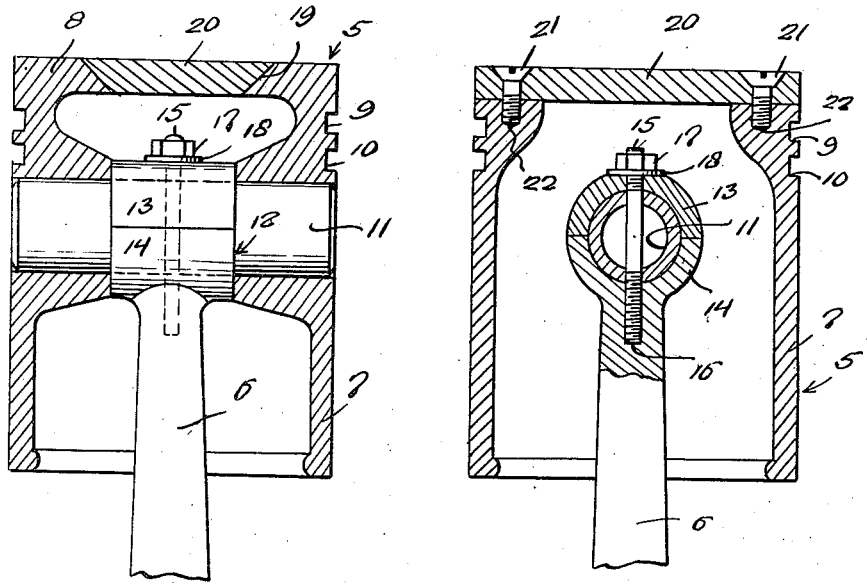
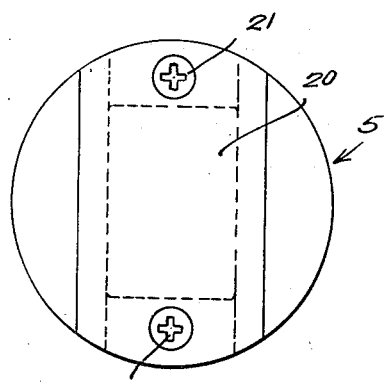
Inventor
Richard C. Luedtke,
Attorneys Patented Dec. 24, 1946

2,413,059

UNITED STATES PATENT OFFICE 2,413,059

PISTON AND CONNECTING ROD THEREOF

Richard C. Luedtke, Glen Burnie, Md.

Application August 3, 1944, Serial No. 547,901

1 Claim. (Cl. 309—19)

This invention relates to pistons and connecting rods for engines and the primary object of the invention is to permit the piston carrying the rings and its wrist pin to be removed from the engine after the removal of the cylinder head of the latter, eliminating the necessity of removing the crank case and the disconnecting of the connecting rod from the crank shaft, or the connecting rod may be removed after the removal of the crank case without removing the piston from the cylinder and disturbing the rings thereof, consequently providing a large saving in time and labor in the servicing or repairing of the engine.

With these and other objects in view as will become more apparent as the description proceeds, the invention consists of certain novel features of construction, combination and arrangement of parts as will be hereinafter more fully described and claimed.

For a complete understanding of my invention, reference is to be had to the following description and accompanying drawing, in which:

Figure 1 is a vertical sectional view illustrating the piston and a fragmentary portion of its connecting rod and constructed in accordance with my invention;

Figure 2 is a sectional view similar to Figure 1 taken at right angles to the showing made in Figure 1;

Figure 3 is a top plan view illustrating the piston.

Referring in detail to the drawing, the numeral 5 indicates the piston and 6 the connecting rod therefor. The skirt of the piston is indicated by the character 7 and the head by the character 8. The skirt of the piston just below the head 8 is provided with the usual ring grooves 9 and just below the ring grooves the skirt 7 has opposed wrist pin bearing openings 10 in which is journaled the wrist pin 11. The conventional bushings may be arranged between the walls of the bearing openings 10 and the wrist pin if desired. Internally, the skirt 7 is built up or increased in thickness for the bearing openings 10 and also for contacting opposite ends of a bearing 12 of the connecting rod 6 to prevent endwise movement of the wrist pin 11 in its bearings.

The bearing 12 of the connecting rod 6 is of the capped sectional type, the sections being indicated by the characters 13 and 14. The section 14 forms an integral part of the connecting rod 6 while the section 13 is held in place by a rod 15 extending through the section 13, wrist pin 11 and threaded into a screw threaded socket 16 formed in the connecting rod. A nut 17 including a washer 18 is threaded on the rod and engages the section 13 to maintain the section 13 assembled on the section 14 of the bearing 12. This construction arranges the nut 17 uppermost within the piston as clearly shown in Figures 1 and 2.

The head 8 of the piston 5 is provided in the top wall thereof with an elongated opening through which the nut 17 may be reached for the application and removal thereof from the rod 15. Opposite walls of the opening are beveled as shown at 19 and a closure plate 20 having correspondingly beveled edges normally closes the opening, being secured in place by said screws 21 threaded into screw threaded sockets 22 provided in the piston 5.

When a piston and a connecting rod of the characters heretofore described and shown in the drawing is employed in an engine, the piston can be removed from the cylinder of the engine after the cylinder head has been removed without disconnecting the connecting rod 6 from the usual crank shaft of the engine. This is accomplished by removing the said screws 21 of the closure plate 20 and removing the nut 17 from the rod 15. After this has been accomplished, the section 13 and the bearing 12 can be lifted off. The piston may then be withdrawn from the cylinder along with the wrist pin 11 and the rings within the ring grooves 9 so that necessary repairs either to the wrist pin, or rings can be made and the device reassembled in the engine within a comparatively short period of time. Should it be desired to remove the connecting rod 6 from the engine without disturbing the piston within the cylinder, this can be accomplished after the removal of the crank case and the cylinder head of the engine and detaching the bearing 12 from the wrist pin. When the connecting rod has been removed as before stated and the piston remaining in the cylinder of the engine, any possibility of the rings being disturbed is eliminated which is very desirable. From the foregoing, it can readily be seen that through the construction of the piston and the connecting rod, many hours can be saved in servicing an engine.

While I have shown and described the preferred embodiment of my invention, it will be understood that minor changes in construction, combination and arrangement of parts may be made without departing from the spirit and scope of the invention as claimed.

Having thus described my invention, what I claim is:

In a piston and connecting rod construction, a piston having a head and a skirt integral therewith, said piston having aligned wrist pin openings therein intermediate said head and skirt, a wrist pin seated in said openings, a connecting rod extending into said skirt of the piston, a bearing on the end of said rod, said bearing receiving said wrist pin, said bearing comprising two mating sections, one of said sections being integral with said connecting rod and the other of said sections being detachable from the rod, said detachable section and wrist pin having aligned openings registering with a screw socket arranged axially of said connecting rod in the end of said connecting rod, and a rod screw-threaded at each end and passing through said openings diametrically of a cross section of said wrist pin, and said screw-threaded rod having one of its ends passing into said screw socket, and the other end carrying a nut which bears against said detachable section for holding said section in position against said wrist pin.

RICHARD C. LUEDTKE.